Aug. 9, 1955   D. H. REEVES   2,715,010
FLUID VALVE ASSEMBLY
Filed June 28, 1949
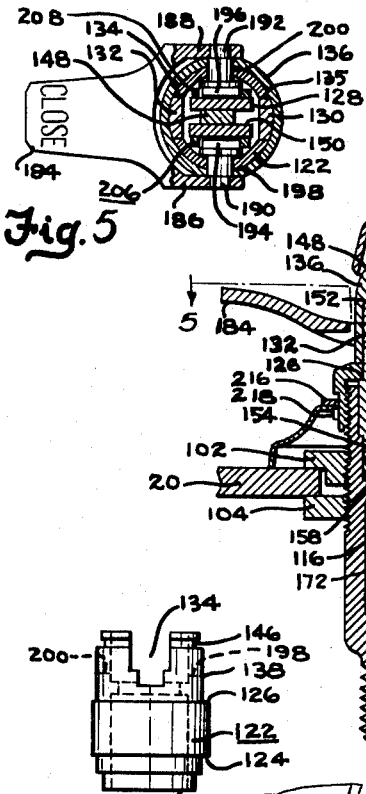
Fig. 5
Fig. 4
Fig. 1
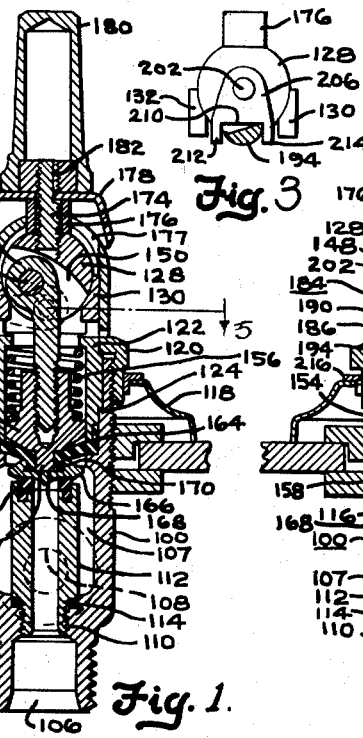
Fig. 3
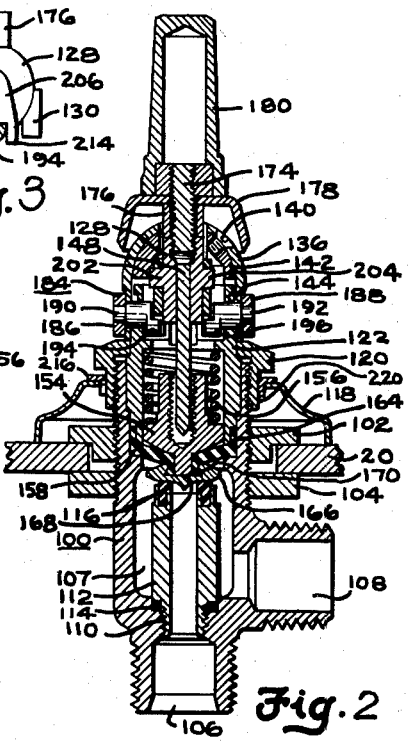
Fig. 2
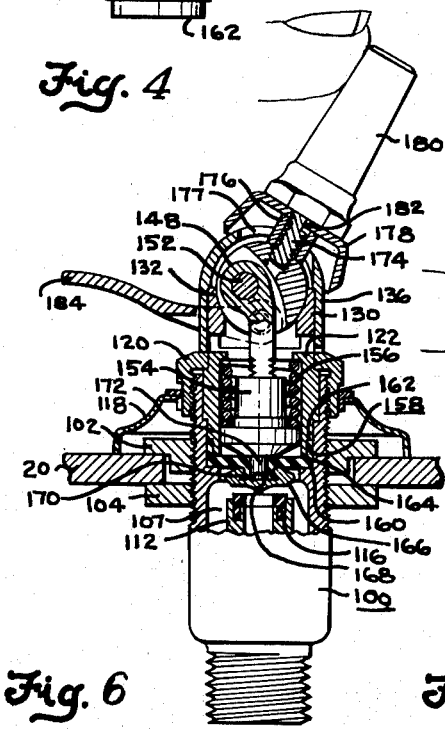
Fig. 6
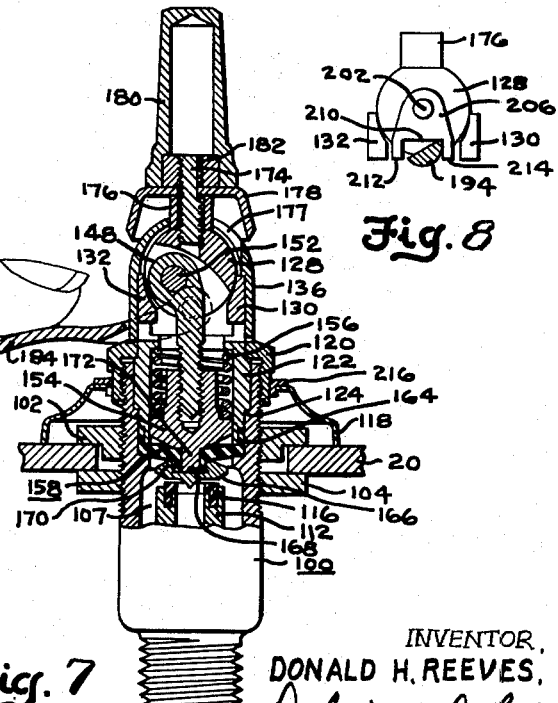
Fig. 8
Fig. 7
INVENTOR.
DONALD H. REEVES.
Dybvig & Dybvig.
BY HIS ATTORNEYS.

United States Patent Office 2,715,010
Patented Aug. 9, 1955

2,715,010

FLUID VALVE ASSEMBLY

Donald H. Reeves, Beulah, Mich.

Application June 28, 1949, Serial No. 101,780

4 Claims. (Cl. 251—74)

This invention relates to a fluid valve assembly or faucet and more particularly to a valve or faucet that may be frequently opened and closed.

This invention is related to the inventions disclosed in my United States Letters Patent Numbers 2,497,558, 2,591,292 and 2,591,293 and in a continuation-in-part of application Serial No. 508,721, now Patent No. 2,497,557.

In the past, valves and faucets have usually been provided with leathers, washers or gaskets that are attached to the movable part and move into and out of engagement with the valve seat in response to predetermined movements of the movable member which supports such leathers, washers or gaskets. In the majority of valves and faucets now in use, such leathers or washers are rotated in position when engaging the valve seat, which causes the leather or washer to wear very rapidly. Furthermore, this rubbing action injures the seat, in that it wears rapidly. In some valves and faucets, attempts have been made to overcome this wearing action by having the leather or washer so mounted in relation to the rotating stem that the leather or washer need not rotate with the stem. Experience has shown, however, that in a great many such cases, corrosion or other action of the water has soon caused the leather or washer and the stem to rotate as a unit, thereby defeating the purpose of this special design.

In the past, furthermore, valves and faucets, particularly those commonly used in connection with lavatories, bath tubs, showers, sinks, laundry tubs and other such applications where there is no other shut-off means between the outlet of the valve or faucet and the discharge point, have been so made that when manually opened to a desired degree, to which degree it will remain opened until manually closed, there is no assurance that the valve will be completely closed, even though that be the wish of the operator, as it is necessary to manually move the valve to its completely closed position in order to prevent leakage. This requires careful operation whenever closing the valve and hasty or slightly careless operation will generally result in incomplete closure of the valve or faucet with its resultant leakage. In closing the now commonly used valve or faucet, it is much easier to so operate it that it will leak slightly than it is to operate it so that it will be completely closed. Because most people realize the necessity to completely close the valve or faucet in order to prevent its leakage, many people, when closing a valve or faucet, will exert undue force into the operation, thereby greatly reducing the life of the washer that is used to effect the closure.

Valves and faucets now in common use are so made that they will remain open to whatever extent the operator leaves them open. While this is in general the most convenient means of operation, there are times when a self-closing faucet would be more convenient, especially if the opening operation were an extremely simple one.

Valves or faucets now in common use require that the operator grasp the operating handle, or, at least, use several fingers in order to open or close the valve or faucet, whereas there are often times when it would be more convenient if this were not necessary, as when the hand is occupied by holding something or is covered with grease or dirt which the operator does not wish to get on the handle of the valve.

Valves of faucets now in common use have most of their working parts in the water chamber where the corrosive action of the water often makes the valve unusable.

The conventional valves now generally used are provided with a rotatably mounted valve stem supporting a leather or washer at its base. Whenever the valve stem is rotated in one direction, the leather or washer is rotated into engagement with the valve seat, to thereby exert sufficient pressure to compress the leather or washer to seal or close the valve. This arrangement proves satisfactory when the contacting parts are in good condition; but the rotating of the valve stem causes the parts to have a rubbing action when sealing the valve, or closing the valve, which causes the contacting parts to wear rapidly, thereby necessitating replacement of the leathers or washers at frequent intervals. This construction also makes it impossible for the pliable washer or seal to conform itself to any irregularities in the seat. These leathers or washers are held in place by screws or nuts which can easily and do often come loose and get out of place, thereby preventing the proper functioning of the valve and often making it impossible to close the valve.

An object of this invention is to improve valve assemblies. More specifically, an object of this invention is to provide a seal that is supported independently of the mechanism that opens and closes the valve, so that the sealing member normally moves in a direction substantially normal to the plane of the valve seat when either opening or closing the valve.

Another object of this invention is to provide a valve or faucet that can be used without having to replace any of the parts to prevent leakage for a longer period of time than is possible with valves or faucets now in general use.

Another object of this invention is to provide a valve or faucet wherein accidental dripping is eliminated and practically impossible.

Another object of this invention is to provide a valve mechanism that may be manipulated to automatically close or to remain in open position when released, at the will of the operator.

Another object of this invention is to provide a valve or faucet that does not require any packing, gaskets or washers to prevent leakage around the control mechanism for the valve.

Another object of this invention is to provide a valve or faucet that does not have parts in the fluid chamber which can come loose and interfere with the operation.

Another object of this invention is to provide a valve or faucet wherein all parts of the operating mechanism are sealed from the fluid that passes through the valve or faucet.

Another object of this invention is to provide valve assemblies so made that when the operator attempts to close the valve, closure will be complete so as to insure no leakage, regardless of how carelessly the closing operation has been performed.

Another object of this invention is to provide valve assemblies wherein excessive pressure cannot be exerted upon the valve seat by the operator, which excessive pressure reduces the life of the seating parts.

Another object of this invention is to provide a valve or faucet assembly of the type that will remain open to any desired degree, but with improved means to make possible the operation of the valve as a self-closing valve, the closing of the valve being accomplished by the most simple pressing of a lever or button.

Another object of this invention is to provide a valve or faucet assembly of such construction that it is unnecessary to grasp the controlling handle or other member in order to either open or close the valve; but either the opening or closing can be accomplished by merely pushing a controlling member, making it possible to perform the operation with a hand that is already engaged in holding something or without transferring dirt, grease or other undesirable materials from the hand to the handle or other controlling member.

Another object of this invention is to provide a valve or faucet assembly using a seal of the diaphragm type, so constructed that the seal is clamped between two metal parts which are positively located in relation to each other and yet which securely hold the seal in place.

Another object of this invention is to provide a valve or faucet assembly of such construction that the parts which are subject to the greatest wear are readily replaceable inserts which can be made of material which has exceedingly good wearing qualities but which would be unsuitable for the parts in which these inserts are used.

The valve mechanism for accomplishing the results set forth above utilizes a yieldable member and a metallic member one of which functions as a valve seat and the other a closure overlying the valve seat, the two members having a relative movement toward and away from each other, the two members being normally biased toward each other to close the valve by a compression spring, the valve being opened by means of a mechanism that includes an actuator mounted in a cylindrical or spherical seat in such a manner that when the handle or actuating mechanism is moved from the home position, it actuates a link connected to the actuator off center from the center of the spherical or cylindrical seat to thereby release the force exerted by the spring against the closure member, permitting the water pressure to open the closure member to open the valve.

Other objects and advantages reside in the construction of parts, the combination thereof and the mode of operation, as will become more apparent from the following description.

Referring to the drawings, Figure 1 is a vertical cross sectional view of a valve, taken through the center thereof.

Figure 2 is a vertical cross sectional view through the center of the same valve, taken at right angles to Figure 1.

Figure 3 is a side view of the friction disc and its socket, together with parts used to disengage the friction disc from its socket when the release lever is depressed.

Figure 4 is a front view of the housing.

Figure 5 is a horizontal cross sectional view taken substantially on line 5—5 in Figure 1.

Figure 6 is a cross sectional view similar to the disclosure in Figure 1, showing the valve in open position when it has been opened by moving the handle from its vertical position.

Figure 7 is a cross sectional view similar to the disclosure in Figure 1, showing the valve being held in open position by the depressing of the lever.

Figure 8 shows the same parts as are shown in Figure 3, showing their relative positions when the lever is depressed as shown in Figure 7.

In the drawings, the reference character 100 designates a main body which is adjustably attached to the support 20 by means of two mounting nuts 102 and 104. The body 100 has an inlet connection 106, an outlet chamber 107 and an outlet connection 108. Into a threaded portion 110 of the body 100 is screwed a seat member 112, a gasket 114 preventing any leakage between the seat member and the body. Securely fastened to the top of the seat member, as by vulcanizing, is a seat 116 of slightly pliable, rubber-like material extending slightly above the top of the seat member 112. An escutcheon 118 forms a decorative cover which hides the mounting nut 102 and the threaded exterior portion of the body 100 above the lock nut.

All parts in Figures 1 and 2 not heretofore described constitute a removably mounted "operating unit assembly," which may be removed as a unit from the body 100 by unscrewing a lock nut 120. A housing 122 has a shoulder which rests upon a shoulder in the body 100 at point 124, positively locating these two pieces in relation to each other when the lock nut 120, which rests upon another shoulder 126 of the housing 122, is screwed down as far as it will go on the body 100, as shown in the drawings. The remaining parts which constitute the operating unit assembly are supported in one way or another by this housing 122, as hereinafter described. A friction disc 128 is supported by two friction blocks 130 and 132, which in turn are supported in two slots 134 and 135 in the housing 122. The friction blocks 130 and 132 are prevented from any outward movement by a cap 136 which extends downwardly over an upper portion 138 (shown in Figure 4) of the housing 122. The cap 136 is held in position by a screw 140, shown in Figure 2, which screws into a cap anchor 142. The cap anchor 142, which must be separable from the housing for assembly purposes, has a segment of an inwardly projecting ring 144 which engages an annular groove 146 (shown in Figure 4) near the top of the housing 122. When the cap 136 is in place, the cap anchor 142 is locked in place, so that the ring segment 144 cannot get out of the groove 146.

A plunger lifter 148 has its upper end pivotally mounted in a slot 150 in the friction disc 128 by a pin 152 which extends through the two sides of the friction disc 128 and through the plunger lifter 148. The lower portion of the plunger lifter 148 is threaded and screwed thereon is a plunger 154 which can slide in a cylindrical bore in the lower portion of the housing 122. A spring 156 exerts a downward pressure on the plunger 154. A seal 158, of flexible, rubber-like material, is clamped between a shoulder 160 of the body 100 and the bottom 162 of the housing 122, the portion of the seal at this point being slightly thicker than the distance between the shoulder 160 and the bottom 162 of the housing when the shoulders on the body and the housing at the point 124 are in contact, thereby insuring a fluid-tight seal at this point. To be sure that the edge of the seal 158 will not become disengaged from its position between the shoulder 160 and the bottom 162 of the housing, an upwardly extending flange 164 is provided on the seal 158, this flange being of such thickness as to be a fairly snug fit between the housing 122 and the body 100. The seal 158 prevents any of the fluid which is in the chamber below it from entering the chamber above it or from escaping between the outside of the housing 122 and the inside of the body 100.

A closure member 166 is provided and is preferably made of a material such as stainless steel, which is relatively non-corrosive and which will not tend to stick to the rubber-like seat 116. The lower side of this closure member 166 is so formed as to assist in deflecting the fluid when the closure is off of the seat, as shown in Figures 5 and 6. In the upper side of the closure 166 is a depression 168 which is wider at its bottom than it is at its opening. The seal 158 has a downwardly projecting tubular extension 170 in its center, the outside diameter of this projection being larger than the smallest diameter of the depression 168 in the closure 166 but smaller than the diameter of the depression at its bottom. This requires that the tubular section 170 be compressed somewhat in order that it can enter the depression 168. Projecting downward from the plunger 154 is a cylindrical portion 172, whose diameter is greater than the constricted diameter of the inside of the tubular extension 170 of the seal 158, so that when this cylindrical portion 172 is forced down into the hole in the seal 158, the rubber-like material of the tubular extension 170 is forced outwardly below the constriction, thereby holding the plunger 154, the seal 158 and the closure 166 together so that as the plunger 154 is raised, the seal 158 and the closure 166 will rise with it.

Securely fastened, as by soldering, to the friction disc 128 is a stud 174, over which is placed a spacer 176 which projects through a slot 177 in the cap 136. A handle skirt 178 rests on the top of the spacer 176 and is held in place by a handle 180 which is screwed onto the stud 174. The stud 174 has one flat side 182 and the hole in the handle skirt 178, through which the stud 174 projects, has one flat side to correspond with that of the stud, forcing the skirt 178 to always be in the same position in relation to the stud and consequently to the operating unit assembly as a whole. This is done so that valve designations, such as for hot and cold water, if placed on the front of the handle skirt, will always be in front. In order to lighten the handle and thereby reduce inertia for reasons which will be described later, the handle is made hollow.

A release lever 184 has two prongs 186 and 188, shown best in Figure 5, which extend along either side of the cap 136. Securely fastened to these prongs 186 and 188 are two concentric studs 190 and 192 which extend inwardly from the prongs and have on their inner ends substantially semi-cylindrical portions 194 and 196, indicated in Figure 2, the shape of which is best shown in Figure 3. The studs 190 and 192 rest in slots 198 and 200 in the housing 122, these slots being at right angles to the slots 134 and 135, as shown in Figure 5, and by dotted lines in Figure 4. These slots 198 and 200 have semi-circular bottoms and two corresponding slots in the cap 136 have semi-circular tops so that these two pairs of slots constitute bearings in which the studs 190 and 192 can freely turn. On the two sides of the friction disc 128 are two cylindrical projections 202 and 204. Pivotally mounted on these projections are two identical release links 206 and 208, the shape of which is best shown in Figure 3. Each of these release links have a horizontal surface 210 from which project downwardly two extensions 212 and 214 which keep the release links in proper position in relation to the semi-cylindrical ends 194 and 196 of the studs, these extensions 212 and 214 being guided by the inner wall of the housing 122 into which they project, as shown in Figure 5.

An escutcheon retainer 216 has several prongs, such as 218, which frictionally grip a cylindrical surface 220 on the lower portion of the lock nut 120 and holds the escutcheon in its proper place. This is not so important when the valve is mounted vertically, as shown in the drawings; but when the valve is mounted horizontally, as is often the case, this retainer is necessary to keep the escutcheon in place.

Having thus described the parts of the valve, its operation will now be described.

When the handle 180 is vertical and no pressure is exerted on the release lever 184, as shown in Figures 1 and 2, the valve is closed so that no fluid can flow, since under these circumstances the closure 166 is being firmly pressed against the flexible seat 116 by the spring 156, acting through the plunger 154. When the valve is assembled, the plunger 154 is so adjusted, by turning it on the thread on the plunger lifter 148, that when the handle 180 is vertical and the closure 166 is firmly on the seat 116, there is a slight looseness between the friction disc 128 and the friction blocks 130 and 132 on which the friction disc normally rests. This results in a slight amount of lost motion of the handle when in the closed position and the presence of this lost motion indicates that the adjustment of the plunger 154 on the plunger lifter 148 is such that the valve can fully close. Moving the handle 180 substantially away from its vertical position, as shown in Figure 6, opens the valve and it will remain open when the handle is released. This is due to the fact that the handle 180, the handle skirt 178 and the friction disc 128, when assembled, become one unit, joined together by the stud 174 and all parts thereof move together as one piece, so that when the handle 180 is moved, it is rotated about the center of the cylindrical portion of the friction disc 128, this cylindrical portion rotating in the arcuate surfaces of the two friction blocks 130 and 132. This rotation of the friction disc 128 causes the pin 152, which is eccentric in relation to the cylindrical portion of the friction disc, to rise or fall, carrying the plunger lifter 148, the plunger 154, the seal 158 and the closure 166 with it. Because of the slot 177 in the cap 136, one end of which holds the handle 180 in its vertical position, the only way in which the pin 152 can travel when the handle is moved out of its vertical position, is upward, so that any movement of the handle out of its vertical position and beyond the point of the lost motion at the closed position will cause the closure 166 to leave the seat 116, thereby allowing the fluid, which enters through the inlet connection 106, to flow into the chamber 107 which is connected to the outlet 108 and the farther the handle is moved from its vertical position, the farther the closure will be moved from the seat and the more fluid will flow.

Due to the fact that the spring 156 is so designed as to exert sufficient pressure to overcome the pressure of the fluid entering the inlet 106, the closure 166 will be forced down upon the seat 116 as soon as the handle 180 is released, unless otherwise restrained. Such restraint is afforded by the friction between the cylindrical portion of the friction disc 128 and the friction blocks 130 and 132 upon which it rests, the shape of the blocks being such as to afford sufficient friction to overcome the action of the spring.

When the valve is open, as shown in Figure 10, there are two ways of closing it. The first way is to manually move the handle back to the vertical position, thereby lowering the pin 152 and the parts controlled thereby, so that the closure 166 is forced downwardly onto the seat 116 by the spring 156. If the handle is moved fully into its vertical position, until stopped by the end of the slot 177 in the cover 136, or if it is moved far enough so that it stops within the limits of the lost motion of the handle, the valve will tightly close.

The movement of the handle when opening the valve must overcome both friction and spring pressure; but when closing the valve, the spring pressure helps overcome the friction. It is, therefore, much easier to close the valve than to open it, with the result that it is very easy and most natural to fully close the valve. There is a chance, nevertheless, that the handle will not be moved far enough toward its vertical position to fully close the valve. For this reason, the release lever 184 has been added and provides the second means for closing the valve. If the valve is open with the handle out of the vertical position, as shown in Figure 6, and the release lever 184 is depressed, as shown in Figure 7, this rotates the studs 190 and 192 in a counter-clockwise direction, as seen in Figures 3 and 8, thereby rotating the substantially semi-circular portions 194 of these studs and thereby raising the release links 206 and 208 which in turn raise the friction disc 128 so that its cylindrical surface is no longer in complete contact with the arcuate surfaces of the friction blocks 130 and 132, as best shown in Figure 8. The friction between the friction disc 128 and the friction blocks 130 and 132 is therefore almost completely removed, so that the spring 156, acting through the plunger 154, the plunger lifter 148 and the pin 152, causes the friction disc 128 to rotate about the centers of the cylindrical projections 202 and 204, which are concentric with the cylindrical portion of the friction disc. This rotation is in a counter-clockwise direction, as seen in Figures 6 and 7, and continues until the spacer 176 is in contact with the front end of the slot 177 in the cap 136, at which time the handle will be in its vertical position. By making the parts light, including the hollowing of the handle, the inertia is so small that only purposefully and with effort can the release lever be depressed and the finger removed from it before the handle has fully returned to its vertical position. It is possible that the depressing of the release lever may hold the valve open slightly even when the handle has returned to its vertical position, but as soon as the release lever is released by the operator, the valve will close. Depressing the release lever, therefore, virtually assures the operator that the valve will close tightly and there will be no accidental partial closing, with its resultant leakage.

Another use of the release lever 184 is for obtaining a small amount of water, as when rinsing a dish or filling a tumbler, in which case, depressing the release lever causes the handle 180 and its attached friction disc 128, the plunger lifter 148, the plunger 154 and the closure 166 to all rise vertically as a unit, it being impossible for the handle to rotate under the action of the spring 156 because the spacer 176 on the handle assembly is against the front end of the slot 177. The closure 166 therefore leaves the seat 116, allowing fluid to flow through the valve. As soon as the release lever is released by the operator, the valve will immediately close. It is therefore apparent that when used in this way, the valve is a self-closing valve, whereas when opened by moving the handle, it stays open, so that in one valve, without any mechanical changes, is combined a self-closing valve and a holding valve, as the operator may select.

Although the preferred embodiments of the valves or faucets have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a fluid valve assembly, the combination including self-closing valve means, control means including a handle with a cylindrical end for opening and closing said valve means to any desired degree within the operative range of the valve means, a housing carrying the control means, a cap over one end of the housing, and friction means for holding said valve means open to any desired degree, the friction means including a socket in which resides the cylindrical end of the handle, the socket being replaceable without the necessity of replacing any other parts and consisting of two blocks held in their proper position by the housing and the cap and of such form as to cause sufficient friction between the socket and the handle so that the handle will remain in any desired position.

2. In a fluid valve assembly, the combination including valve means, control means, including a handle with a cylindrical end for opening and closing the valve means to any desired degree within the operative range of the valve means, a socket in which the cylindrical end of the handle resides, and second control means including a manually operated member other than said handle for moving the cylindrical end of the handle out of its socket so as to cause the valve to open.

3. In a fluid valve assembly, the combination including valve means, control means, including a handle with a cylindrical end for opening and closing the valve means to any desired degree within the operative range of the valve means by means of oscillation of the handle, a housing which carries the control means, a socket in which the cylindrical end of the handle resides, and second control means including a control lever, one end of which is pivotally attached to the housing and is so connected to the cylindrical end of the handle as to cause said cylindrical end of the handle to move out of engagement with the socket when the unpivoted end of the lever is depressed.

4. In a fluid valve assembly, the combination including valve means, control means, including an oscillatory handle with a cylindrical end for opening and closing the valve means to any desired degree within the operative range of the valve means by means of oscillation of the handle, a housing which carries the control means, a socket in which the cylindrical end of the handle resides, and second control means including a lever, one end of which is bifurcated and pivotally attached to the housing by means of inwardly projecting studs having substantially semi-circular inner ends, cylindrical projections from each side of the cylindrical end of the handle and concentric therewith, and two links pivotally mounted on the two cylindrical projections from the handle, these two links having recessed surfaces which rest on the substantially semi-circular ends of the studs in such manner that rotation of the studs when the unpivoted end of the lever is depressed causes the links to so move as to move the cylindrical end of the handle out of engagement with its socket.

References Cited in the file of this patent

UNITED STATES PATENTS

| | | |
|---|---|---|
| 570,772 | Sampson | Nov. 3, 1896 |
| 578,736 | Gustafson | Mar. 16, 1897 |
| 619,216 | Phillips | Feb. 7, 1899 |
| 620,122 | Gustafson | Feb. 28, 1899 |
| 941,703 | Fitts | Nov. 30, 1909 |
| 954,898 | Stenberg | Apr. 12, 1910 |
| 966,672 | Ellison | Aug. 9, 1910 |
| 1,045,399 | Hague | Nov. 26, 1912 |
| 1,078,875 | Pyle | Nov. 28, 1913 |
| 1,605,765 | Papin | Nov. 2, 1926 |
| 1,629,496 | Fraser | May 24, 1927 |
| 1,635,875 | Albrecht | July 12, 1927 |
| 1,844,528 | Smith | Feb. 9, 1932 |
| 2,074,240 | Saunders | Mar. 16, 1937 |
| 2,089,977 | Marchant | Aug. 17, 1937 |
| 2,388,988 | Mueser | Nov. 13, 1945 |

FOREIGN PATENTS

| | | |
|---|---|---|
| 27,863 | Switzerland | 1903 |
| 414,091 | France | 1910 |
| 731,300 | France | 1932 |
| 319,936 | Great Britain | 1929 |
| 442,790 | Great Britain | 1936 |